United States Patent [19]

Sadri et al.

[11] Patent Number: 4,846,611
[45] Date of Patent: Jul. 11, 1989

[54] FASTENING SYSTEM AND FASTENER FOR SHIPPING CONTAINERS AND THE LIKE

[75] Inventors: Shahriar M. Sadri, El Toro; Marvin R. Hicks, Riverside, both of Calif.

[73] Assignee: Huck Manufacturing Company, Irvine, Calif.

[21] Appl. No.: 159,875

[22] Filed: Feb. 24, 1988

[51] Int. Cl.$^4$ ............................................. F16B 13/04
[52] U.S. Cl. ........................................ 411/43; 411/70; 411/339
[58] Field of Search ...................... 411/34–38, 411/41–43, 45, 46, 70, 352, 353, 339, 50, 51; 403/408.1

[56] References Cited

U.S. PATENT DOCUMENTS

| | | | |
|---|---|---|---|
| 2,405,613 | 8/1946 | Shaff | 411/70 |
| 3,515,419 | 6/1970 | Baugh | 411/70 |
| 4,609,317 | 9/1986 | Dixon et al. | 411/339 |
| 4,615,655 | 10/1986 | Dixon | 411/43 |
| 4,639,174 | 1/1987 | Denham et al. | 411/43 |

FOREIGN PATENT DOCUMENTS 1262601 9/1961 France ...................... 411/43

Primary Examiner—Neil R. Wilson
Attorney, Agent, or Firm—Lawrence Shurupoff

[57] ABSTRACT

A pull type fastener including a tubular sleeve and an elongated pin having a disposable pull portion at one end thereof with the sleeve having an enlarged pin head and a shank, a helically splined portion on the pin shank having ridges and grooves and adapted to engage a preselected portion of the sleeve shank bore to move the sleeve material into the spline grooves. The degree of interference between the splines and the sleeve shank, and the relative hardness ratio of the pin to the sleeve being designed such that the sleeve material will flow into the spline grooves without radially expanding the sleeve into interference with the bore of the workpieces being fastened.

The result being that until the moment of clamp up the sleeve will rotate relative to the pin along the helical splines at a minimum pull force, then at clamp up a momentary and substantially increased torsional force resulting from the sleeve rotation being arrested assists in severing the pin from the pull portion thereof.

17 Claims, 3 Drawing Sheets

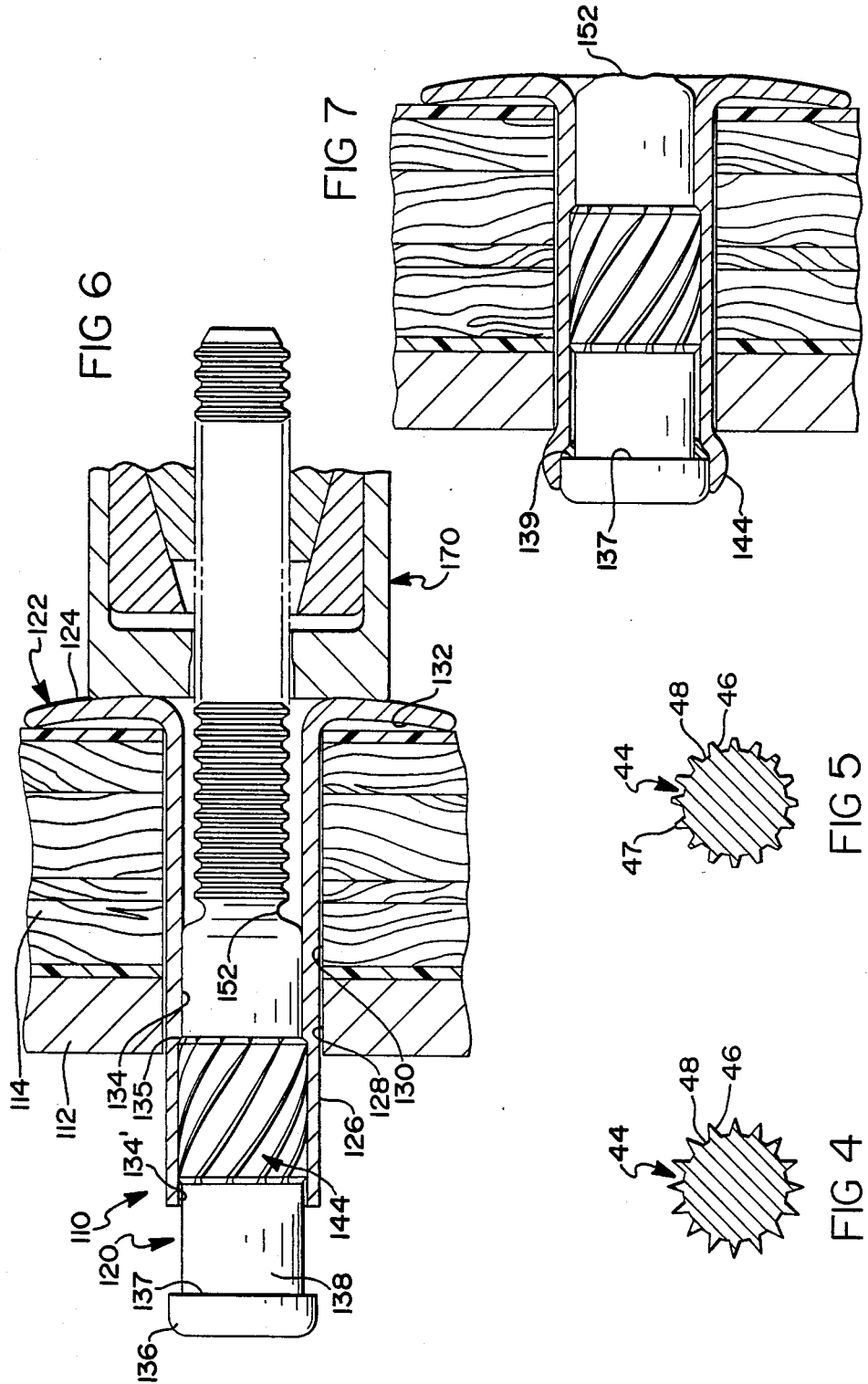

PRIOR
ART

PRIOR
ART

FASTENING SYSTEM AND FASTENER FOR SHIPPING CONTAINERS AND THE LIKE

BACKGROUND OF THE INVENTION

The present invention relates to a fastening system including pull type fasteners, comprising a pin and a sleeve, for manufacturing shipping containers and the like.

Shipping containers are frequently of a construction including a hard metal exterior layer and one or more interior layers of softer materials such as plywood, fiberboard, etc. In fastening the layers together pull type fasteners can be used of a type generally shown in the U.S. Pat. No. 3,515,419 issued to C. W. Baugh on June 2, 1970.

The pull type fastener includes a pin and a sleeve and is set by applying a relative axial force between the pin and sleeve with the excess shank of the pin being severed upon completion of the installation. With that type of fastener, it is desirable that the component engaging the interior surface have a relatively large head to provide good load distribution to inhibit crushing. It is also desirable that the set fastener have a relatively low profile and hence smooth surface on the interior side in order to maximize the interior load carrying volume and to avoid snagging of the container contents on fastener protrusions. It is also desirable that the fastener provide a watertight seal and inhibit tampering, i.e. fastener removal. It is also desirable that the fastener have a large bearing, low profile head to engage the outer container surface to support high clamping loads and resist vibration. Likewise it is important that installation loads and pin break shock loads be kept to a minimum to avoid the effects of pin bounce loosening the integrity of the joint.

In some constructions, such as in the Baugh patent supra, a combination mechanical lock and friction lock is used to hold the pin and sleeve together. Speaking generally this is a functionally satisfactory design. However, the design is somewhat complex and thus expensive, e.g. an extended sleeve, a carefully constructed convex shaped undersurface on the pin head and a multisectioned pin construction. It is particularly grip sensitive in that it can not accommodate a wide variation in thickness of the workpieces being secured together by the fastener. Further the friction lock between the sleeve and straight splined pin portion is only supplementary to the mechanical lock formed by turning out the ends of the sleeve to overlap the bore at the exterior of the workpiece. And last, the pin break loads are fairly high since so much metal is being moved, e.g. the sleeve expanded at the friction lock and flared at the end to form the mechanical lock. A high pin break load by itself is not particularly undesirable. However this results in high pin bounce, or reaction force, when the fastener is brought to final clamp up and the disposable pull portion of the pin is pulled off by a pure tensile load. This pin bounce or reaction force can result in lower, unsatisfactory, final clamp up loads of the fastener relative to the workpieces.

As an improvement over the aforementioned Baugh design, the assignee of the present invention developed the fastener shown in FIGS. 7 and 8 as prior art, which is more fully disclosed in abandoned U.S. patent application Ser. No. 701,347, filed Feb. 13, 1985 the disclosure of which is incorporated herein by reference. It included a helically splined pin portion for the friction lock and an internally formed mechanical lock at the rearward end of the splines formed by a radially extending annular lock shoulder on the pin adapted to engage and deform the lead end of the sleeve into a lock pocket. It offered the advantages of greater grip range accommodation and slightly less expense due to the shorter sleeve length. But, pin break loads remained fairly high, as in Baugh. Consequently, pin bounce remained a significant concern. Furthermore, despite the theory that on installation the pin would rotate slightly relative to the pin as the sleeve overcame the helical splines, this in fact did not occur, at least not with any degree of reliability. This is due to several reasons, not the least of which is that with the installation equipment designed for the fastener (i) the gripping pressure of the tool jaws was too high to allow the pin to rotate and (ii) the friction between sleeve head and tool anvil was too high to allow the sleeve to rotate. Finally, this particular fastener was designed such that, as in Baugh, the sleeve would be radially expanded by the pin spline portion into an interference fit with the bore. This requires a sleeve material which, although softer than the pin, is relatively hard and this in turn was found to result in the sleeve material resisting flow into the helical grooves of the pin spline portion. In some cases the sleeve material was radially sheared since the pin and sleeve could not rotate relative to one another as noted above.

SUMMARY OF THE INVENTION

The present invention includes a pull type fastener comprising a pin and sleeve. Both pin and sleeve have radially enlarged heads to support required clamp loads without damage to the clamped workpieces. The pin includes a helically splined portion at the end thereof immediately adjacent the breakneck. The splined portion is extended in length sufficient to accommodate a wide variation of grip range and a reliable interlock with the interior of the sleeve.

The sleeve material is soft relative to the pin splined portion to (i) allow the sleeve material to flow within and substantially fill the helical grooves within the pin spline portion and (ii) substantially preclude radial expansion of the sleeve into interference with the bore of the workpieces.

The pin spline portion itself is uniquely structured in several ways. First, each spline includes a relatively high helix angle. Second, the height of each spline and spline geometry in general is structured such that it will cause the sleeve material to flow into the spline grooves but will not cause the sleeve to be radially expanded to any appreciable extent and certainly not into interference with the bore of the workpieces being clamped together. Preferably the spline geometry will comprise a pyramidal cross-section at the lead end with the initial pointed spline crest thereafter being flat and gradually widening throughout its length.

As a fastening system, the sleeve is allowed to rotate relative to the pin as it follows the helix of the pin splines with minimal frictional resistance and resultant significantly reduced installation load, most of which is a pure tensile load, until the near instantaneous moment of final clamp up. At the point of final clamp up, frictional engagement of the underside of the sleeve head with the workpiece will stop any relative rotation between pin and sleeve, thus creating a significantly increased torsion load which assists in breaking the pin at the breakneck. This torsional assist significantly lowers the tensile load otherwise required to break the pin at the breakneck and consequently significantly reduces the degree of pin bounce.

A special installation tool anvil is provided which is freely rotatable about the chuck jaws pulling on the pin. This allows the sleeve to rotate along the pin splines during installation.

In the preferred form of the invention a non-blind type fastener with a unique pin and sleeve combination is utilized.

In another form of the invention, the fastener can be constructed as a blind fastener having an extended sleeve projection beyond the workpiece to engage a reduced diameter pin head that when pulled into engagement with the sleeve end will cause it to bulb out radially beyond the bore diameter. Otherwise, the features of the blind fastener embodiment of the invention, and the method of installing it, are substantially the same as with the non-blind preferred embodiment.

Each form of the fastener also provides, among other features, increased grip range accommodation, ease of installation, reduced installation loads and pin bounce, and a desirable, basically frictional, interlock providing superior sustained clamp up loads and retention.

Thus it is an object of the present invention to provide a new and improved fastening system including a unique pull type fastener for securing structural assemblies of the type noted in which the fastener can accommodate a fairly large grip range with a single pin and sleeve.

It is another object to provide a fastener, of the above noted type, having a unique interlock between pin and sleeve.

It is another object of the present invention to provide a fastener, of the above noted type, which does not require an interference fit with the workpiece bore and is thus capable of accommodating larger variations in workpiece bore diameter.

It is another object to provide a fastener which can be set at lower pull force loads throughout the installation sequence and particularly at the point of pin break.

It is another object of the present invention to provide a fastener having an increased resistance to pin push out and loss of clamp up loads over extended periods of use.

It is still another object of the present invention to provide a pull type fastener of the blind type and non-blind type having unique features including those previously noted.

It is a general object of the present invention to provide new and improved fastening system including unique fastener constructions for manufacturing shipping containers or the like.

Other objects, features, and advantages of the present invention will become apparent from the subsequent description and the appended claims, taken in conjunction with the accompanying drawings in which:

Figure 1:
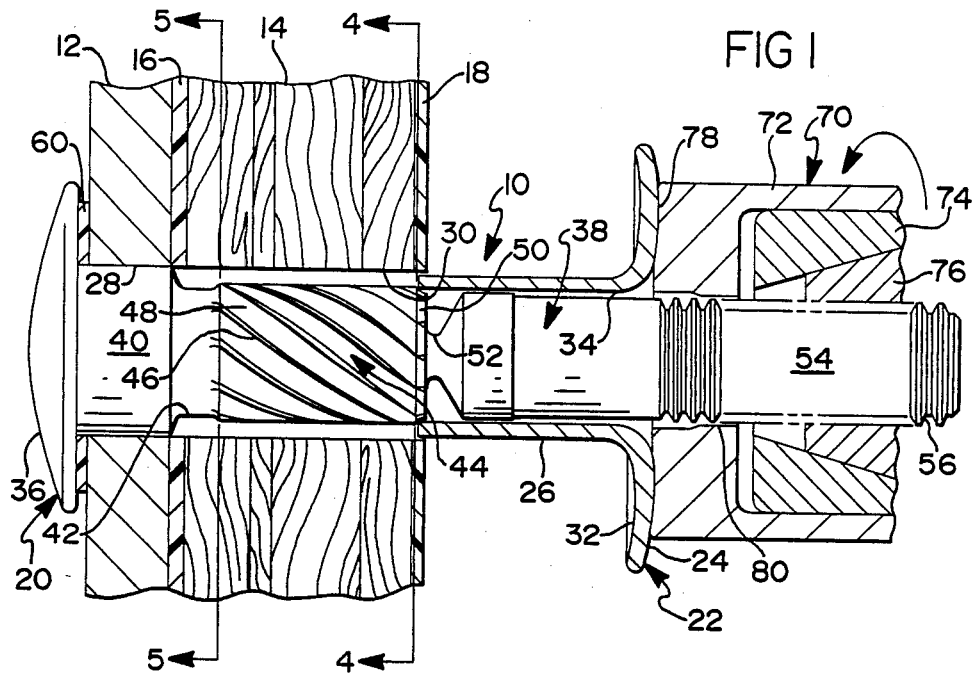
FIG. 1 is an elevational view with some parts shown in section of a non-blind type fastener of the present invention, prior to being installed, in a structural assembly to be fastened together.
Figure 2:
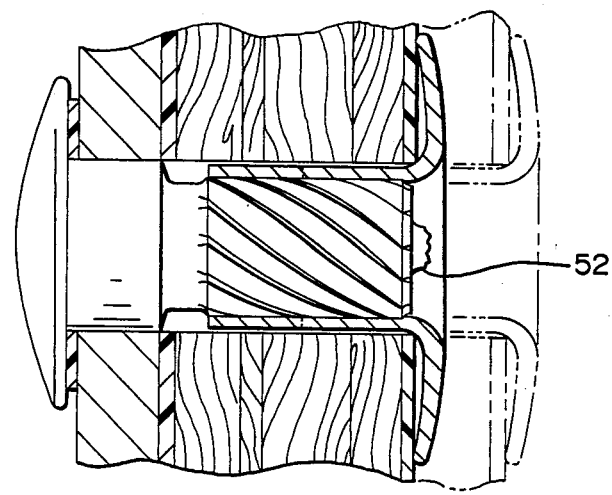
FIG. 2 is a view similar to FIG. 1 of the fastener after it has been installed and depicting the minimum grip condition in solid lines and the maximum grip condition in dotted lines.
Figure 3:
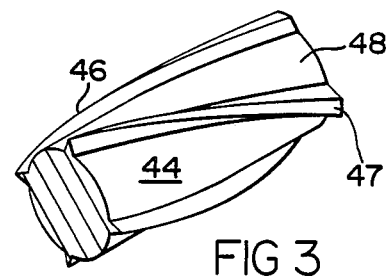
FIG. 3 is an enlarged fragmentary view of the pin spline section lying between lines 3—3 and 4—4 of FIG. 1 and showing a representative number of single flutes or splines.
Figure 8:
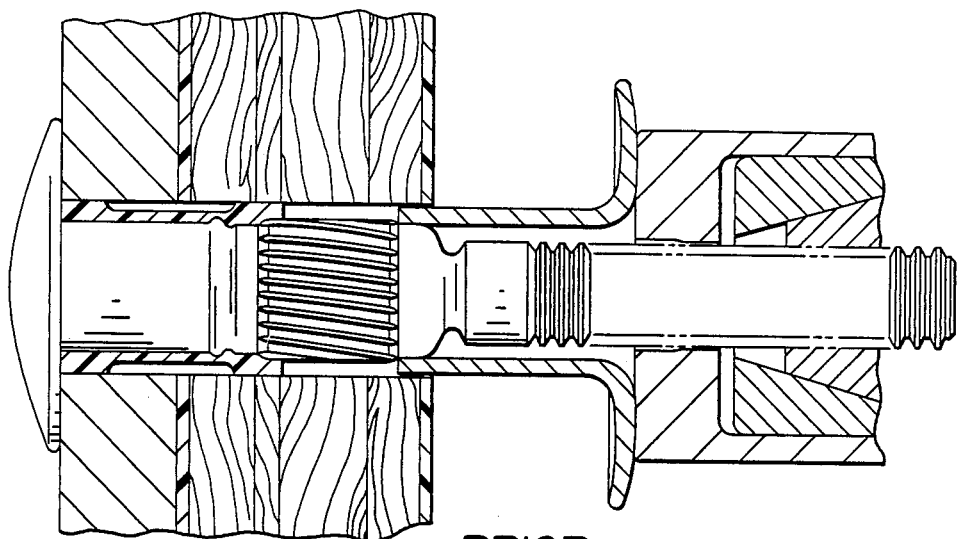
Figure 9:
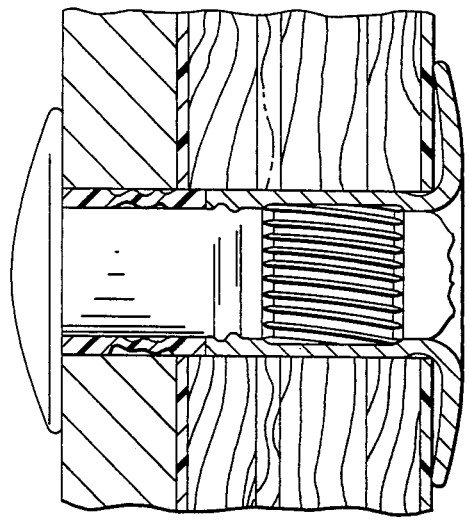

FIGS. 4 and 5 are enlarged sectional views of the fastener of FIG. 1 taken along the lines 4—4 and 5—5, respectively, in FIG. 1;

FIGS. 6 and 7 are views similar to FIGS. 1 and 2, respectively but showing a blind type embodiment of the fastener of the present invention; and FIGS. 8 and 9 are views similar to FIGS. 1 and 2, respectively, but showing a prior art fastener.

DETAILED DESCRIPTION OF THE PREFERRED EMBODIMENT

Looking now to FIG. 1, a fastener 10 is shown in assembly relationship with a plurality of workpieces 12 and 14. For a typical shipping container or the like, the workpiece 12 can be a metal bracket, strap, frame, etc. located at the exterior of the container and can be constructed of sheet metal such as steel or aluminum; the body or walls of the container can be constructed of members such as workpiece 14 which is fabricated of plywood, fiberboard, etc., or other materials which have a relatively soft core and are susceptible to crushing under high, local loads. In the embodiment shown in FIG. 1 the workpiece 14 is constructed of a fiberglass reinforced plywood having a plywood core and fiberglass reinforced plastic layers 16 and 18 with the layer 18 defining the interior of the container. In this regard the plastic layers 16 and 18 are impervious to water to provide a watertight construction. It should be understood that the preceding materials for a shipping container have been discussed by way of example only and that the present invention can be utilized in other applications and with other materials.

The fastener 10 includes a pin 20 and a sleeve 22. The sleeve 22 has an enlarged head 24 and a generally straight shank 26 which is adapted to fit in a clearance relationship in at least some of the aligned bores 28 and 30 through workpieces 12 and 14, respectively. The sleeve head 24 is generally inwardly dished or concave on its inner surface 32 to provide clearance with the corner of bore 30 of inner workpiece 14. At the same time the concave structure distributes the installation and final clamp loads radially outwardly to inhibit excessive localized deformation or crushing of the inside wall 14, 18. The sleeve shank 26 has a generally uniform outside diameter and a through bore 34 of a generally uniform diameter.

The pin 20 has an enlarged head 36 and an elongated shank 38. Pin head 36 is of a flat, truss head construction wit its outer diameter being substantially larger than the diameter of bores 28, 30. The large head 36 has a low profile to provide a generally smooth surface at the exterior of t' ≥ sheet metal workpiece 12. The pin shank 38 is of an overall diameter less than workpiece bores 28, 30 and has a straight, smooth first shank portion 40 of a diameter slightly less than workpiece bores 28, 30 adjacent the head 36. First shank portion 40 terminates at an annular shoulder defined by a straight, smooth second shank portion 42 of decreased diameter, which is followed by a splined portion 44. The splined portion 44 has ridges 46 and grooves 48 which are helically formed generally at an angle of around 30 to 60 degrees with the axis of pin 20. A splined helix angle of about 45° is preferred, and amounts to a trade off between (i) lower required installation loads—thus lower capacity, less expensive installation tools—at the lower helix angles and (ii) greater retention or pin push out capacity at the higher helix angles. The splined portion 44 is formed by a rolling die process, consequently, the major diameter or height of the spline will be greater than that of second shank portion 42, while the minor diameter of spline will be less than that of the second shank portion 42. The major diameter of the spline ridges 46 is constant from front to rear and is slightly larger than the diameter of sleeve bore 34 but not enough as to cause any appreciable expansion of the sleeve during installation as the pin and sleeve are pulled together. More on this is described below.

Each spline 46 preferably includes a continuously variable width crest beginning with a sharp point at the lead end and thereafter continuing as a flat and gradually widening crest 47. To conveniently form such a spline shape in a typical production rolling die requires that the minor diameter of the splines gradually increase as the width of the crest 47 increases. In the example given below of a nominal ⅜ inch diameter pin this increase in minor diameter would range from 0.005 inch to 0.010 inch.

Stated differently, this particular spline geometry is that which would result if one were to (i) form a spline having the identical pyramdial shape in cross-section throughout its length on a tapered pin shank portion having the larger diameter at the rearward end (towards the pin head), (ii) present the pin to the face of a grinding wheel with pin axis and wheel face axis being parallel, and (iii) grind off the top of each spline from the pointed lead end rearward to provide a single major spline diameter for the entire spline portion equal to that of the spline at the lead end as initially formed. Obviously this same spline configuration is easier produced in the rolling die itself.

In another form of the invention, each spline 46 is of the same cross-sectional shape throughout its length, i.e. pyramidal. In such an embodiment, both the minor and major spline diameter remains the same throughout the length of spline portion 44.

Following the splined portion 44 is a generally straight shank portion 50 which, prior to rolling the splines, was simply part of the second shank portion. Consequently, straight portion 50 is generally of the same diameter as second shank portion 42 and is sized to provide clearance or a slight interference with sleeve bore 34 and acts to pilot the sleeve 26 onto the pin 20. A reduced diameter annular breakneck groove 52 is located between straight pin shank portion 50 and a pull portion 54 comprised of a plurality of annular pull grooves 56.

In order to provide a watertight fastened joint, a sealing washer 60 having an outer diameter proximating that of the pin head is located over the first pin shank portion 40. The washer 60 is made of a generally elastic material which is resiliently deformable e.g. an elastic synethic polyamide material such as nylon. The diameter of the sealing washer bore is proximate to that of the pin shank portion 38 but because of its resilient nature can be readily expanded over the splined portion 44 for retained assembly onto the pin 20.

As mentioned above, the pin and sleeve hardness ratios and amount of interference between the sleeve inner diameter and pin spline outer diameter have been designed so that no cutting of the sleeve material occurs during setting and no radial expansion of the sleeve occurs. Rather, the sleeve material flows into the spline grooves.

The optimum pin to sleeve hardness ratio is about 1.9/1. However, a ratio range of 1.70/1 to 2.10/1 is considered acceptable. A ratio more than 2.1 is not recommended since sustained pin retention may suffer.

The material normally selected for this type of fastener is carbon steel or low alloy steel for the pin, for example, SAE1022 with small additions of Boron for the pin and SAE 1010 for the sleeve.

As for specific fastener design specifications, a common fastener is one having a nominal ⅜ inch diameter. Minimum workpiece thickness for this fastener is 0.750 inches. Grip range is 0.125 inches so the maximum workpiece thickness would be 0.875 inches. The length of the spline section 44 is 0.400 inches. At minimum grip the entire spline section 44 is engaged by sleeve 22, whereas at maximum grip 0.275 inches of the spline is engaged—roughly two-thirds. Sleeve bore diameter 26 is 0.280 inches which matches the pitch diameter of the splines 46.

In this example of a nominal ⅜ inch diameter fastener, the pin hardness is 390, as measured by a Vickers diamond pyramid test (hereinafter "Vickers"). The sleeve hardness is 195 Vickers. The sleeve and pin materials are as referenced above.

The fastener 10 is set by the application of a relative axial force between the pin 20 and sleeve 22 via a pull tool 70 (partially shown) which can be of a type generally known in the art and hence the details thereof have been omitted, with the following exception.

Since it is necessary to the invention that the sleeve rotate under the influence of the pin splines 46 during installation, the tool anvil 72 which engages the sleeve head during installation is constructed to be freely rotatable relative to the chuck 74 and chuck jaws 76, which engage the pull grooves 56 and pull the fastener into clamp up in the manner described below. The construction of the tool 70 forms no part of this invention.

To install the fastener 10, the operator first inserts the pin 20 into the workpiece bores 28, 30. Then the operator moves to the inside of the container or opposite side of the workpieces 12, 14 and places the sleeve 22 over the protruding portion of the pin shank 38.

Next the tool 70 is applied to the fastener 10 and actuated by the operator to set it. Tool 70 has an anvil member 72 having an engaging surface 78 which is concave to generally conform to the convex outer surface of the sleeve head 24. A collet assembly 74, 76 is slidably supported within the anvil member 72 and has a plurality of chuck jaws 76 adapted to grippingly engage the pull grooves 56 of pull portion 54. A reduced diameter bore 80 located in the anvil member 72 is only slightly larger than the outside diameter of the pull portion 54 whereby it pilots the pull portion 54 into the opening defined by the chuck jaws 76. Upon actuation of the tool, the collet assembly is moved axially rearwardly or away from the engaging surface 78 of the anvil member whereby a relative axial force is applied between the pin 20 and sleeve 22. The axial force moves the pin head 36 towards the confronting end of sleeve shank 26. As this occurs the splined portion 44 engages the sleeve end and moves the material of the bore portion 34 radially into the spline grooves 48. Sleeve material is continuously displaced by the splines throughout the spline length travelled by the sleeve, thus continuously increasing the degree of groove fill by the sleeve material. This produces a very effective interlock between pin and spline. This interlock is further enhanced by the relatively high helix angle of each spline and the fact that the sleeve material is in intimate contact with the entire length of the spline portion received within the sleeve. Since the sleeve material is soft relative to the pin, as described above, the excess sleeve material will move relatively freely through the spline grooves 48, filling the spline grooves rather than expanding the sleeve into interference with workpiece bores 28, 30. Further, since (i) the sleeve is permitted to rotate relative to the anvil, as above described, and (ii) the sleeve will not be put into interference with the workpiece bore, the sleeve will rotate in the direction of the splines in reaction to the helix angle of the splines and the sleeve material displaced by the splines will flow into the grooves.

The installation load throughout the process to final clamp up generally remains constant, and it is independent of the designed grip range.

At some point the concave surface 32 of the sleeve head 24 engages the interior surface of workpiece 14, including plastic layer 18, and axial movement of the sleeve 22 is arrested. Instantaneously a torsion force is created on the pin since the pin tends to move an incremental amount while the sleeve rotation is arrested because of the friction between the sleeve head and the workpiece 14. The torsion is created by the helical splines reacting against the sleeve material in the spline grooves. This torsional load combines with the tensile load causing the pin shank 38 to be severed at the breakneck groove 52 and the installation completed as shown in FIG. 2. Specifically, the torsional load produced on the pin during installation by action of the sleeve rotating along the pin splines is estimated at approximately 15 to 20 percent of the total installation load. However, at the point of final clamp when the pin is to be broken this torsional load or reaction force increases to approximately 40% —thus providing the sudden jolt or impulse load at that moment when the pin is to be broken, and causing pin break at a tensile load substantially less than would otherwise be required were the sleeve not freely rotating about the pin.

In FIG. 2 the fastener is shown as installed in workpieces of maximum thickness in dotted lines and minimum thickness in solid lines. It will be noted that the stub end of the pin formed at the breakneck groove 52 is always recessed within the sleeve bore so as not to project beyond the plane of the sleeve head.

Since an extremely effective frictional lock holds the pin 20 and sleeve 22 together, pin bounce upon fracture at the breakneck groove 52 is resisted. Further, since the tensile load in pulling the fastener together into clamping is assisted by the sleeve induced torsional load, the installation load is kept to a minimum for any given final clamp load holding the workpieces 12, 14 together.

In the example given of a ⅜ inch nominal diameter fastener, the installation load and pin break load are 3600 and 4500 pounds, respectively. The push out or pull off force required to separate the fastener at minimum and maximum thickness is in the order of 2300 pounds and 2000 pounds, respectively, for the preferred variable width crest and 1700 pounds and 1300 pounds, respectively, for the non-variable crest design mentioned.

Another form of fastener for shipping containers and the like known as the blind fastener, is shown in FIGS. 6 and 7. It includes many features similar to that previously described.

In FIG. 6, a blind fastener 110 is shown in assembly relationship with a plurality of workpieces 112 and 114, which can be similar to workpieces 12 and 14 and hence will not be described in detail.

The fastener 110 includes a pin 120 and a sleeve 122. The sleeve 122 has an enlarged head 124 and a generally straight shank 126 which is adapted to fit in a clearance relationship in aligned openings 128 and 130 through workpieces 112 and 114, respectively. The sleeve head 122 is generally inwardly dished or concave on its inner surface 132 for reasons previously described.

The sleeve shank 126 has a generally uniform outside diameter and a through bore comprising a forward bore portion 134 and a rearward enlarged diameter counterbore portion 134'. A shoulder 135 is defined by the juncture of forward bore portion 134 ad rearward bore portion 134'.

The pin 120 has an enlarged head 136 and elongated shank 138. Pin head 136 is of a flat construction with its outer diameter being generally the same as or slightly less than the outside diameter of the sleeve shank 126. The pin shank 138 has a straight, smooth shank portion 140 adjacent the head 136 and terminates at splined portion 144. In all other respects the fastener is the same as previously described.

The fastener 110 is set by the application of a relative axial force between the pin 120 and sleeve 130 via a pull tool 170 (partially shown), again, all as previously described regarding the embodiment shown in FIGS. 1 and 2.

During installation, as the movement of pin 120 continues the pin head 136 engages the end of sleeve shank 126 and attempts to move into the counterbore portion 134'. The engaging surface 137 of pin head 136 is relatively straight transversely and operates to shear a ring 139 (FIG. 7) of material from the end of sleeve shank 126 as it moves into the counterbore 134'. The ring 139 assists in the formation of an enlarged tulip head 141 and in providing a good, relatively large bearing area for the tulip head 141 against the exterior workpiece 112.

With the formation of the tulip head 141 completed, further axial movement of the pin 120 is resisted by both the pin head 136 in its final sleeve head forming position at one end and the sleeve head at the other end. As with the preferred embodiment previously described, at the moment of final clamp up there is instantaneously provided a torsional force which, coupled with the tensile load pulling on the pin, severs the pin shank 126 at the breakneck groove 152 and the installation is completed as shown in FIG. 7. The installation loads, design criteria for the degree of interference and axial contact between pin spline portion and sleeve, material hardness of pin and sleeve are basically the same as described regarding the preferred non-blind embodiment.

While it will be apparent that the preferred embodiments of the invention disclosed are well calculated to fulfill the objects above stated, it will be appreciated that the invention is susceptible to modification, variation and change without departing from the proper scope or fairm meaning of the invention.

What is claimed is:

1. In a fastening system for securing workpieces having aligned openings, said system comprising:
   a fastener including a tubular sleeve and an elongated pin,
   said sleeve having an enlarged sleeve head and an elongated sleeve shank,
   said sleeve shank having a through bore and an end portion at the end of said sleeve shank opposite said sleeve head, said pin having an enlarged pin head and a pin shank, said pin shank comprising a splined portion located near said pin head and having a plurality of helical ridges and intervening grooves, said spline ridges having a major diameter greater than that of said sleeve shank through bore and a minor diameter less than that of said pin shank, a breakneck groove adjacent said splined portion having a diameter less than that of said pin shank, a pull portion located on the end of said pin shank opposite said pin head and adapted to be gripped by a tool for applying a relative axial force between said pin and said sleeve to set the fastener, said splined portion adapted to engage said portion of said sleeve shank to move the material of said sleeve shank into said spline grooves, the spline portion of the pin being of a relatively hard material and the sleeve being of a relatively soft material, said spline grooves and ridges allowing a preselected cross-section and volume of sleeve material to flow into said grooves into intimate contact with said splines, and the hardness of the pin spline portion relative to the sleeve being of a ratio of about 1.7/1 to 2.1/1 so as to allow the sleeve during installation as the sleeve and pin are pulled together to rotate about the pin against the reaction force of the helically disposed splines until the moment of final clamp up, at which moment a torsional force will result between sleeve and pin to assist in breaking the pin at said breakneck groove, whereby the structural characteristics and physical properties of the pin and sleeve are optimized to provide a frictional interlocking relationship between the sleeve and splined portion which gives an extremely high retention load of the pin relative to the sleeve and requires a minimum pull force during installation.

2. The fastening system of claim 1 with said spline pitch diameter being substantially equal to the inner diameter of said sleeve through bore.

3. The fastening system of claim 2 with said spline grooves and ridges being helically formed at an angle of around 30 to 60 degrees relative to the axis of said pin shank.

4. The fastening system of claim 3 with said spline ridges being helically formed at an angle of around 45 degrees relative to the axis of said pin shank.

5. The fastening system of claim 3 with said fastener including a sealing washer located on said pin shank adjacent said pin head, said sealing washer being of a resiliently deformable material and being engageable between said sleeve head and the adjacent workpiece to assist in providing a watertight seal.

6. The fastening system of claim 1 with the hardness of the pin spline portion relative to the sleeve being of a ratio of about 1.9.

7. The fastening system of claim 1 with the pin has a hardness of about 390 Vickers and the sleeve a hardness of about 195 Vickers.

8. The fastening system of claim 7 wherein the major diameter of each said spline is constant throughout the length of said spline portion, each said spline being pyramidal in cross-section at the lead end first engaging said end portion of the sleeve, the crest of each said spline thereafter being relatively flat and gradually increasing in width from said lead end to the other end.

9. In a fastening system for securing workpieces having aligned openings, said system comprising:

a fastener including a tubular sleeve and an elongated pin, said sleeve having an enlarged sleeve head and an elongated sleeve shank, said sleeve shank having a through bore and an end portion at the end of said sleeve shank opposite said sleeve head, said pin having an enlarged pin head and a pin shank, said pin shank comprising a splined portion located near said pin head and having a plurality of splines in the form of helical ridges and intervening grooves, said spline ridges having a major diameter greater than that of said sleeve shank through bore and a minor diameter less than that of said pin shank, the major diameter of each said spline being constant throughout the length of said spline portion, each said spline being pyramidal in cross-section at the lead end first engaging said end portion of the sleeve, the crest of each said spline thereafter being relatively flat and gradually increasing in width from said lead end to the other end, the pitch diameter of said splines being substantially equal to the inner diameter of said sleeve through bore, said spline grooves and ridges being helically formed at an angle of around 30 to 60 degrees relative to the axis of said pin shank, a breakneck groove adjacent said splined portion having a diameter less than that of said pin shank, a pull portion located on the end of said pin shank opposite said pin head and adapted to be gripped by a tool for applying a relative axial force between said pin and said sleeve to set the fastener, said splined portion adapted to engage said portion of said sleeve shank to move the material of said sleeve shank into said spline grooves, the hardness of the pin spline portion relative to the sleeve being of a ratio of about 1.7/1 to 2.1/1 as the sleeve and pin are pulled together so as to allow the sleeve during installation to rotate about the pin against the reaction force of the helicaly disposed splines until the moment of final clamp up, at which moment a torsional force will result between sleeve and pin to assist in breaking the pin at said breakneck groove, said spline grooves and ridges thereby allowing a preselected cross-section and volume of sleeve material to flow into said grooves into intimate contact with said splines to provide a frictional interlocking relationship between the sleeve and splined portion which gives an extremely high retention load of the pin relative to the sleeve and requires a minimum pull force during installation.

10. In a fastening system for securing workpieces having aligned openings, said system comprising:

a fastener including a tubular sleeve and an elongated pin, said sleeve having an enlarged sleeve head and an elongated sleeve shank, said sleeve shank having a through bore and an end portion at the end of said sleeve shank opposite said sleeve head, said sleeve shank through bore comprising a first bore portion and a second bore portion at the end of said sleeve shank opposite from said sleeve head, said second bore portion having a diameter greater than said first bore portion to define a radially inwardly extending shoulder at the juncture of said first and second bore portions, said shoulder constituting said end portion, said pin further having a generally smooth shank portion between said pin head and said splined portion, said splined portion engaging said second bore and said shoulder of said sleeve shank in a frictional connection for frictionally securing said pin and said sleeve together in a preinstalled condition, said frictional connection being sufficient to hold said pin and said sleeve together as the tool is applied to said pull portion, said pin having an enlarged pin head and a pin shank, said pin head having a diameter generally equal to the outside diameter of said pin shank and having a surface beneath said pin head adapted to engage the confronting end of said sleeve shank, said pin shank comprising a splined portion located near said pin head and having a plurality of helical ridges and intervening grooves, said spline ridges having a major diameter greater than that of said sleeve shank through bore and a minor diameter less than that of said pin shank, a breakneck groove adjacent said splined portion having a diameter less than that of said pin shank, a pull portion located on the end of said pin shank opposite said pin head and adapted to be gripped by a tool for applying a relative axial force between said pin and said sleeve to set the fastener, said splined portion adapted to engage said portion of said sleeve shank to move the material of said sleeve shank into said spline grooves, the spline portion of the pin being of a relatively hard material and the sleeve being of a relatively soft material, said spline grooves and ridges allowing a preselected cross-section and volume of sleeve material to flow into said grooves into intimate contact with said splines, said pin head radially expanding said sleeve shank to form an enlarged head having a diameter greater than the confronting one of the aligned openings in the workpieces, said pin being adapted to sever at said breakneck groove when said installation force attains a preselected magnitude after said enlarged sleeve head has been formed and the fastener has been pulled to the point of final clamp up, whereby the structural characteristics and physical properties of the pin and sleeve are optimized to provide a frictional interlocking relationship between the sleeve and splined portion which gives an extremely high retention load of the pin relative to the sleeve and requires a minimum pull force during installation.

11. The fastening system of claim 10 with said spline pitch diameter being substantially equal to the inner diameter of said sleeve through bore.

12. The fastening system of claim 11 with said spline grooves and ridges being helically formed at an angle of around 30 to 60 degrees relative to the axis of said pin shank.

13. The fastening system of claim 12 with said spline ridges being helically formed at an angle of around 45 degrees relative to the axis of said pin shank.

14. The fastening system of claim 12 with the hardness of the pin spline portion relative to the sleeve being of a ratio of about 1.7/1 to 2.1/1 whereby during installation as the sleeve and pin are pulled together, the sleeve will be allowed to rotate about the pin against the reaction force of the helically disposed splines until the moment of final clamp up, at which moment a torsional force will result between sleeve and pin to assist in breaking the pin at said breakneck groove.

15. The fastening system of claim 14 with the hardness of the pin spline portion relative to the sleeve being of a ratio of about 1.9.

16. The fastening system of claim 14 with the pin has a hardness of about 390 Vickers and the sleeve a hardness of about 195 Vickers.

17. The fastening system of claim 16 wherein the major diameter of each said spline is constant throughout the length of said spline portion, each said spline being pyramidal in cross-section at the lead end first engaging said end portion of the sleeve, the crest of each said spline thereafter being relatively flat and gradually increasing in width from said lead end to the other end.

* * * * *